(12) United States Patent
Walsh et al.

(10) Patent No.: US 6,637,115 B2
(45) Date of Patent: Oct. 28, 2003

(54) PIPE CUTTER

(76) Inventors: Richard T. Walsh, 43 Knob Hill Rd., Glastonbury, CT (US) 06033; Richard T. Walsh, Jr., 190 Hidden Lake Rd., Higganum, CT (US) 06441

( * ) Notice: Subject to any disclaimer, the term of this patent is extended or adjusted under 35 U.S.C. 154(b) by 0 days.

(21) Appl. No.: 10/191,707

(22) Filed: Jul. 8, 2002

(65) Prior Publication Data

US 2003/0121156 A1 Jul. 3, 2003

Related U.S. Application Data (63) Continuation-in-part of application No. 10/036,984, filed on Dec. 31, 2001.

(51) Int. Cl.[7] .............................................. B23D 21/06
(52) U.S. Cl. ................... 30/94; 30/95; 30/101
(58) Field of Search ............................... 30/101, 97, 98, 30/99, 93, 94, 95

(56) References Cited

U.S. PATENT DOCUMENTS

| | | | | | |
|---|---|---|---|---|---|
| 3,715,804 | A | * | 2/1973 | Kelley | 30/102 |
| 4,305,205 | A | * | 12/1981 | Girala | 30/102 |
| 4,416,062 | A | * | 11/1983 | Cummings | 30/101 |
| 4,769,911 | A | * | 9/1988 | Araki | 30/94 |
| 4,802,278 | A | * | 2/1989 | Vanderpol et al. | 30/97 |
| 4,831,732 | A | * | 5/1989 | Garton | 30/101 |
| 5,495,672 | A | * | 3/1996 | Kritchever et al. | 30/97 |
| 5,836,079 | A | * | 11/1998 | Cronin et al. | 30/101 |
| 6,065,212 | A | * | 5/2000 | Lazarevic | 30/101 |
| 6,481,105 | B1 | * | 11/2002 | Haung | 30/98 |

* cited by examiner

Primary Examiner—Allan N. Shoap
Assistant Examiner—Ghassen Alie
(74) Attorney, Agent, or Firm—Ira S. Dorman (57) ABSTRACT

A cutting head for a portable, hand-held, power-operated pipe cutter is constructed with at least one channel in a rotating mounting plate assembly, to permit lateral insertion of a pipe. The power-transmission arrangement employed includes at least one component that effectively spans the entrance to the channel in the mounting plate so as to ensure that driving engagement therebetween is constantly maintained.

25 Claims, 6 Drawing Sheets

PIPE CUTTER

CROSS-REFERENCE TO RELATED APPLICATION

This application is a continuation-in-part of application Ser. No. 10/036,984, filed Dec. 31, 2001.

BACKGROUND OF THE INVENTION

Conventional hand-operated pipe cutters are conveniently used for cutting installed pipe, but as far as is known no currently available power tool has that capability. Moreover, the use of manual pipe cutters requires, in any event, considerable time and effort.

SUMMARY OF THE INVENTION

The broad objects of the present invention are to provide a power-operated pipe cutter, especially a hand-held tool, and a cutting head therefor, which can readily be used to cut pipe and which can reduce significantly the time and effort required to cut both in-place pipe and also separate lengths of material.

Additional objects of the invention are to provide such a pipe cutter and cutting head which are of relatively incomplex construction and which can readily be manufactured at relatively low cost.

It has now been found that certain of the foregoing and related objects of the invention are attained by the provision of a cutting head comprising: a support member having a supporting portion; a mounting member supported by the supporting portion of the support member for rotation about a central axis, the mounting member having at least a first channel extending inwardly from the periphery thereof for permitting lateral insertion of a pipe, for disposition on the central axis of the head; cutting means mounted on the mounting member for rotation therewith and comprising at least two contact elements disposed generally diametrically of the axis and along opposite sides of the first channel, the cutting means being constructed for varying the spacing between the two contact elements so as to permit such lateral insertion of a pipe therebetween and to enable the contact elements to engage opposite sides of a pipe disposed on the central axis, at least one of the contact elements being a cutting element; and a power-transmission arrangement comprising driven means on a peripheral portion of the mounting member and drive means interengaged with the driven means, the power-transmission arrangement including at least one component that effectively spans the entrance to the first channel at the periphery of the mounting member for enabling constant delivery of power to the mounting member.

In certain preferred embodiments the drive means will be constructed to engage the peripheral portion of the mounting member at at least two locations for effecting rotation thereof, the locations being spaced from one another a distance greater than the width of the entrance to the channel in the mounting member. The mounting member will usually comprise at least one substantially circular plate, with the peripheral portion (constituting the driven means) comprising a circumferential marginal portion thereon; the "at least one" plate may be a sprocket, and the mounting member may comprise an assembly in which a second plate, attached to the sprocket, mounts the cutting means.

In most instances the driven means will comprise an array of teeth extending along the circumferential marginal portion of the "one" plate. The cooperating drive means will typically comprise an endless chain disposed to cause a segment thereof, which is longer than the first channel entrance width and which provides the "at least one component," to be in constant engagement with the array of teeth. Alternatively, the drive means may comprise a plurality of gears or pinions providing the "at least one component," one of which gears is disposed at each of the two spaced locations referred to. The drive means may also comprise an endless belt disposed to cause a segment thereof to be in constant driving engagement with the circumferential marginal portion of the "one" plate, which portion is constructed for driven engagement by the belt segment.

In other preferred embodiments the "at least one component" of the cutting head will comprise a peripheral segment piece that is dimensioned and configured to effectively span the first channel entrance, the mounting member being cooperatively constructed for displaceably positioning the segment piece in such a spanning relationship. The segment piece may for example be sidably mounted on the mounting member, and may comprise a further marginal portion of a substantially circular mounting member when so positioned across the channel entrance.

The cutting means employed in the cutting head will preferably include mounting means comprised of a pair of confronting portions, each supporting at least one contact element, and self-centering adjustment means operatively connected to the confronting portions for varying the spacing between the contact elements, the adjustment means being effective for simultaneously moving the contact elements toward and away from one another through substantially equal distances. Biasing means, acting effectively upon at least one of the contact elements (e.g., the cutting wheel, or a jaw supporting it), will normally serve to urge the diametrically opposed contact elements toward one another.

The confronting portions will usually comprise separate jaws, with the adjustment means advantageously comprising a threaded member having opposite end portions in operative engagement with elements on the jaws for simultaneously moving them in opposite directions. Alternatively, the jaws may have confronting toothed rack portions thereon in operative engagement with a pinion (constituting the adjustment means) rotatably interposed therebetween, again for simultaneously moving the jaws in opposite directions. Means will desirably be provided for causing the adjustment means to operatively engage the support member for advancing and retracting the confronting portions of the mounting means, upon rotation of the mounting member in one or the other direction.

In certain embodiments, the supporting portion of the support member will be constructed for partially surrounding a pipe, and will have at least a second channel extending inwardly from the periphery of the support member for permitting lateral insertion of a pipe thereinto for disposition on the central axis of the head.

Preferably, however, the supporting portion will comprise a forward marginal portion on the support member. In such instances the mounting member may comprise at least one substantially circular plate, the peripheral portion referred to may comprise a circumferential marginal portion of the "one plate," and the supporting portion of the support member may form an arcuate channel constructed to seat and engage the circumferential marginal portion of the one plate of the mounting member.

Other objects of the invention are attained by the provision of a power-operated pipe cutter comprising the cutting head herein described. The cutter will additionally include a body on which the head is disposed, and a motor in operative engagement with the drive means of the power transmission arrangement employed. In most instances the cutter will be integrated for fully portable hand-held use, albeit stand-alone units, to which a separate motor or power pack may be coupled, may also be provided; the tool may be either battery operated or driven by line current. The cutter may or may not include a clutch feature, which can provide additional protection against the stripping of threads, breakage of teeth, etc.

DETAILED DESCRIPTION OF THE PREFERRED AND ILLUSTRATED EMBODIMENTS

Figure 1:
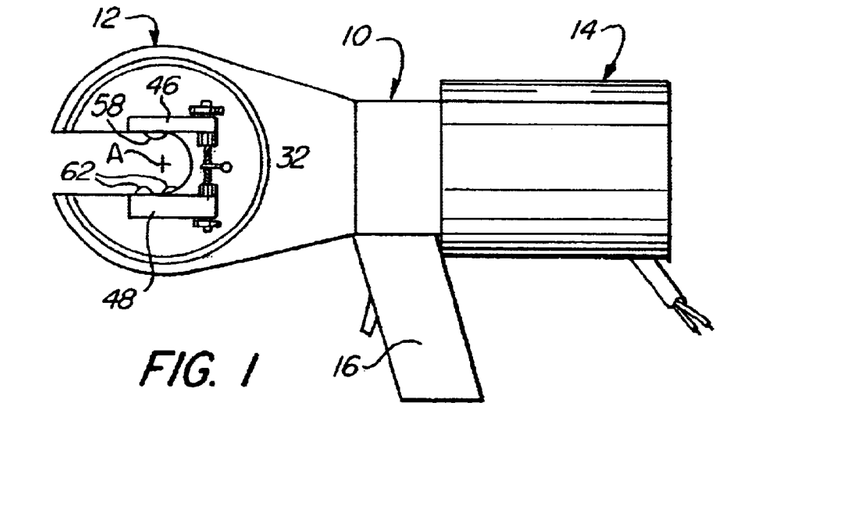
FIG. 1 is a diagrammatic side elevational view depicting a power-operated, hand-held pipe cutter embodying the present invention.
Figure 2:
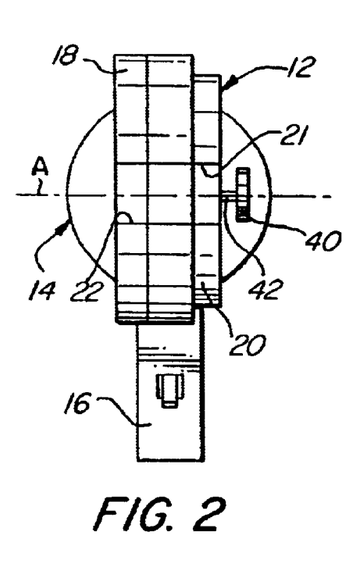
FIG. 2 is a diagrammatic front view of the pipe cutter of FIG. 1.

Turning initially to FIGS. 1 and 2 of the drawings, therein illustrated is a power-operated pipe-cutting tool embodying the present invention. The tool consists of a body, generally designated by the numeral 10, upon which are mounted a cutting head, generally designated by the numeral 12, and an electric motor generally designated by the numeral 14; a variable speed electric motor, having forward and reverse capability, will typically be used. Switch 16 controls energization and direction of the motor 14, and hence of the cutting head 12.

Figure 3:
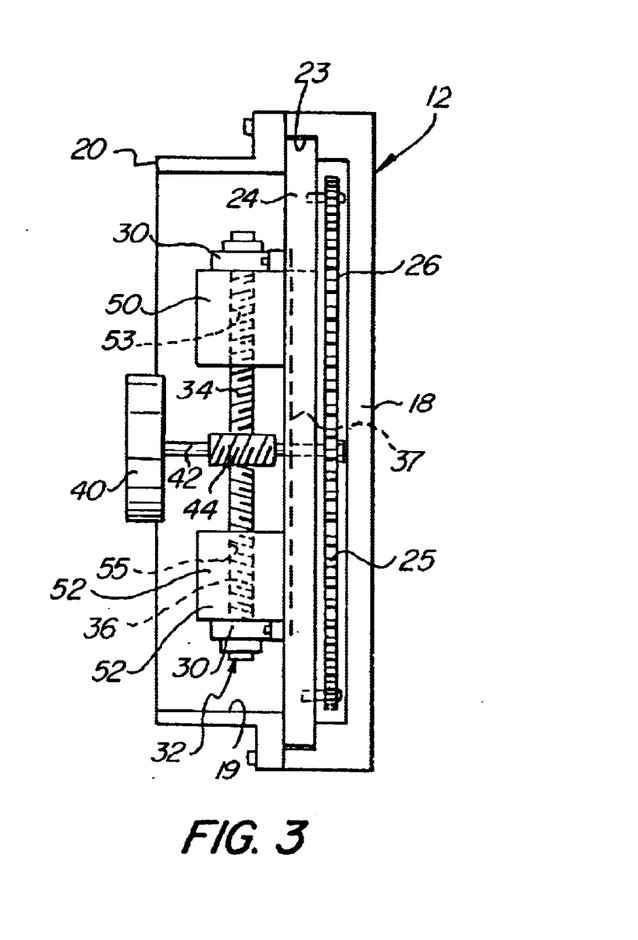
FIG. 3 is a rear view of the cutting head of FIGS. 1 and 2, drawn to an enlarged scale.
Figure 4:
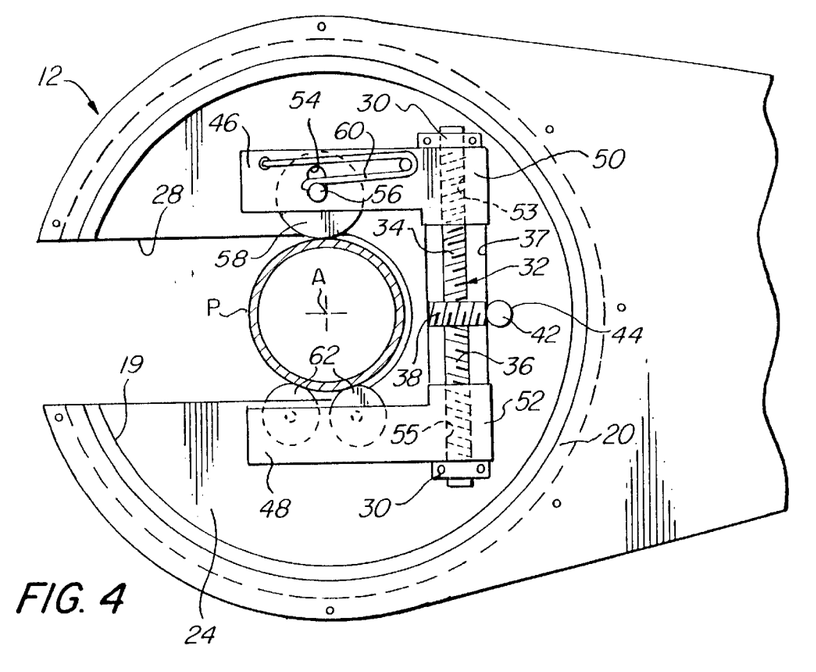
FIG. 4 is a side elevational view of the same cutting head, drawn to the scale of FIG. 3 and with the support member fragmentarily illustrated.

As seen in FIGS. 3 and 4, the cutting head 10 includes a support member 18, to which is attached a circumferential ring or flange 20. The support member 18 is formed with a channel 22 extending inwardly from the periphery thereof, and the flange has a gap at 21, which registers with the channel 22. A circumferential shoulder 23 is formed in the support member 18, and serves to seat a circular mounting plate 24 for rotation thereon, the plate being retained by the flange 20; means (not shown) is provided for lubricating the mating surfaces of the member 18, the flange 20, and the plate 24.

Figure 5:
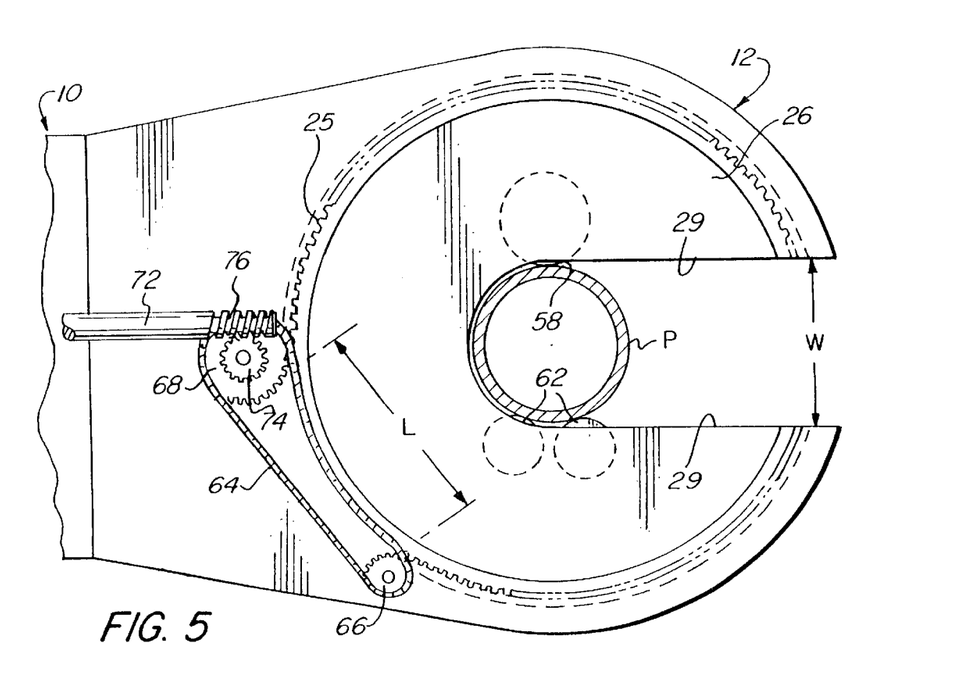
FIG. 5 is a fragmentary elevational view of the opposite side of the cutting head of the foregoing figures, showing a drive train suitable for use therein.

As is seen is FIG. 5 (a covering panel, normally provided, having been removed to expose underlying features), a drive sprocket 26 is attached to the inner, or back, side of the mounting plate 24; generally, the sprocket 26 will be spaced slightly from the plate 24 and of somewhat smaller diameter (as illustrated) to best accommodate a drive chain. The plate 24 and the sprocket 26 are slotted at 28 and 29, respectively, such that the resulting channel matches the channel 22 of the support member 18 when the mounting assembly (plate 24 and sprocket 26) are rotated to a position of registration therewith. As will be appreciated, the channels 22, 28, and 29, and the gap 21 in the flange 20, enable a pipe section "P" to be inserted laterally into the throat of the cutting head 12 for positioning on its central axis "A".

A pair of journal blocks 30 mount the opposite ends of an adjustment screw, generally designated by the numeral 32, upon the outer, front surface of the plate 24. The screw 32 has two threaded end portions 34, 36, which extend in opposite directions and which carry right-hand and left-hand threads, respectively, and a take-off gear 38 is affixed centrally thereon. Also mounted on the plate 24 is an adjustment knob 40 which includes a shaft 42 carrying a worm gear section 44, the latter being in meshing engagement with the take-off gear 38 such that turning of the knob 40 will effect rotation of the screw 32.

Each of two jaws 46, 48 has a mounting end portion 50, 52 provided with a threaded aperture 53, 55, respectively, the threads having opposite pitch directions to cooperatively engage the threaded end portions 34, 36 of the screw 32. As will be apparent, turning the knob 40 in one or the other direction will effect rotation of the adjustment screw 32, thereby serving to increase or decrease the spacing between the jaws 46 and 48. A shallow slide channel 37 is formed into the front face of the plate 24, and serves to slidably engage lateral elements of the portions 50, 52 for guiding translation of the jaws 46, 48.

The periphery of the knob 40 may be disposed to engage (e.g., by simple friction) an inner surface 19 of the flange 20 in such manner that rotation of the plate assembly 24, 26 will advance or retract the jaws (depending upon the direction of rotation), causing them to automatically close upon the pipe P, in the initial phase of the cutting operation, and to withdraw from the pipe after the cut has been made; limit means (not shown in these figures) may be incorporated into such a mechanism so as to prevent over-tightening of the jaws upon the pipe.

The upper jaw 46 is slotted at 54 so as to slidably seat the axle 56 of a cutting wheel 58 for limited movement in a radial direction. A pair of tension springs 60 (only one of which is seen, and which are desirably recessed into the sides of the jaw 46) apply constant biasing force upon the shaft 56, urging the cutting wheel 58 toward the central axis of the head; albeit normally advantageous, the springs 60 may be eliminated if preferred, such as to reduce manufacturing cost.

The lower jaw 48 carries a pair of rollers 62, which are mounted in a substantially diametrical relationship to the cutting wheel 58 for engagement of the opposite sides of a pipe P positioned for cutting. As will be evident, rotation of the plate assembly 24, 26 will cause the cutting wheel 58 to cut through the inserted pipe, in cooperation with the rollers 62; as cutting proceeds the biasing force of the springs 60 will ensure sufficient advance of the wheel 58 for effecting complete severance, albeit the self-centering adjustment mechanism may also be tightened to apply a higher level of force. It will be appreciated that the composition of the cutting wheel 58 will be suitably selected based upon the nature of the material (i.e., metal or plastic) to be cut, and that cutting and contact elements other than wheels (e.g., fixed blades or other sharp elements) and rollers (e.g., fixed bearing surfaces) may be employed as appropriate.

As illustrated in FIGS. 5 through 8, various means may be utilized to effect rotation of the plate 24. In all instances however it will be appreciated that the power transmission arrangement is so constructed that drive force is delivered constantly to the mounting assembly despite the periodic presentation of channels and gaps during its rotation.

FIG. 5 shows one form of drive power transmission arrangement suitable for use in the cutting head of the invention. It utilizes an endless chain 64, trained about a simple gear 66 and the larger element 68 of a compound gear, the latter gear including a smaller coaxial element 74 that is engaged by the threaded end portion 76 of a worm shaft 72, which is in turn connected (by means not shown) directly or indirectly to the drive motor 14.

It will be appreciated that the width W of the channels 28 and 29 in the plate 24 and sprocket 26, respectively, is of lesser dimension than the length L of the segment of the chain 64 which engages the teeth 25 of the sprocket 26. When the mouth of the channel 29 is presented to the drive chain 64, therefore, the contacting segment spans the channel and ensures the constant delivery of power for effecting rotation of the mounting plate 24.

Figure 6:
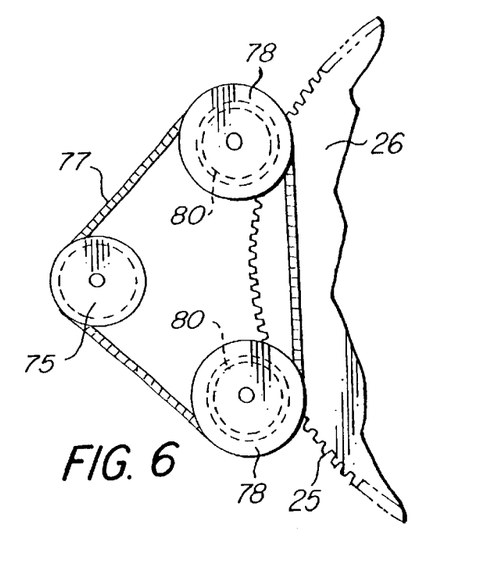
FIGS. 6 through 8 are fragmentary diagrammatic views depicting alternative drive arrangements suitable for use in the cutting head of the invention.

FIG. 6 shows an alternative power transmission arrangement which utilizes an endless chain (or belt) 77, trained about the larger element 78 of a pair of compound gears, the smaller elements 80 of which mesh with the teeth 25 of the sprocket 26. The drive train includes a pinion 75, which is operatively connected (by means not shown) to the motor 14.

Figure 7:
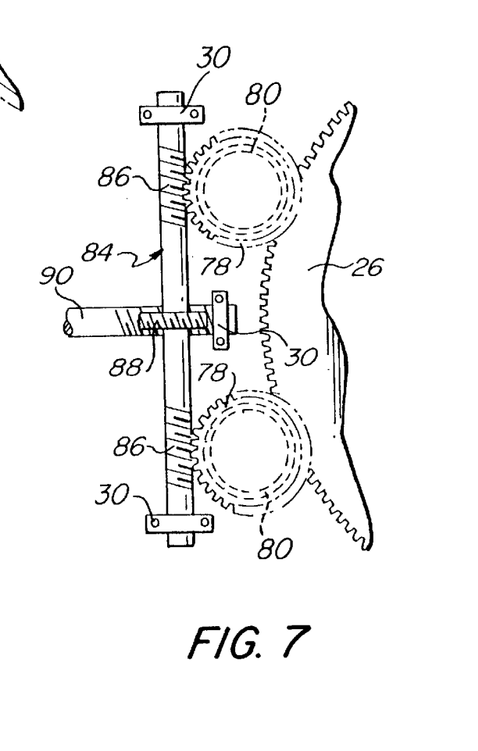

FIG. 7 illustrates another arrangement in which compound gears are driven by a common shaft, generally designated by the numeral 84 and secured in journal blocks 30. The shaft 84 has threaded opposite end portions 86 (with the same pitch direction) in meshing engagement with the larger elements 78 of the two drive gears, the smaller elements 80 of which mesh with the teeth of the sprocket 26. A pinion 88, affixed centrally on the shaft 84, is driven by a worm shaft 90 operatively connected (by means not shown) to the motor 14 and supported, at its inner end, by another journal block 30.

Figure 8:
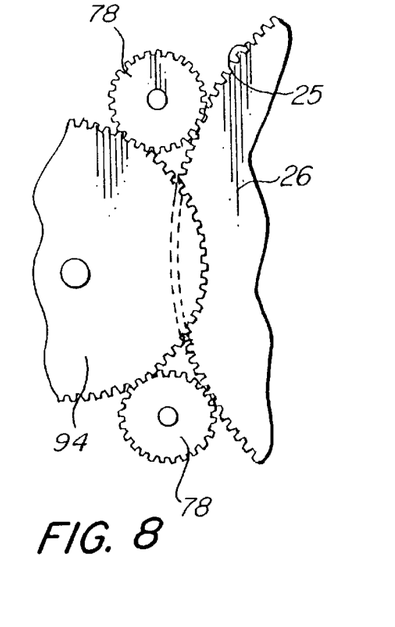

The arrangement shown in FIG. 8 is similar to that depicted in FIGS. 6 and 7, with the exception that a gear 94 drives the compound gears 78, 80 directly. As will be appreciated, in each of the arrangements depicted in FIGS. 6 through 8 the compound gears are spaced circumferentially a distance greater than the width W of the sprocket channel 29. Again, this arrangement ensures that power is constantly delivered to the sprocket notwithstanding the gap at the mouth of its channel. Other mechanical components, suitable for use in these power transmission arrangements, will be evident to those skilled in the art and may of course be added or substituted, as appropriate; for example, bevel gears may be utilized for making right-angle connections.

Figure 9:
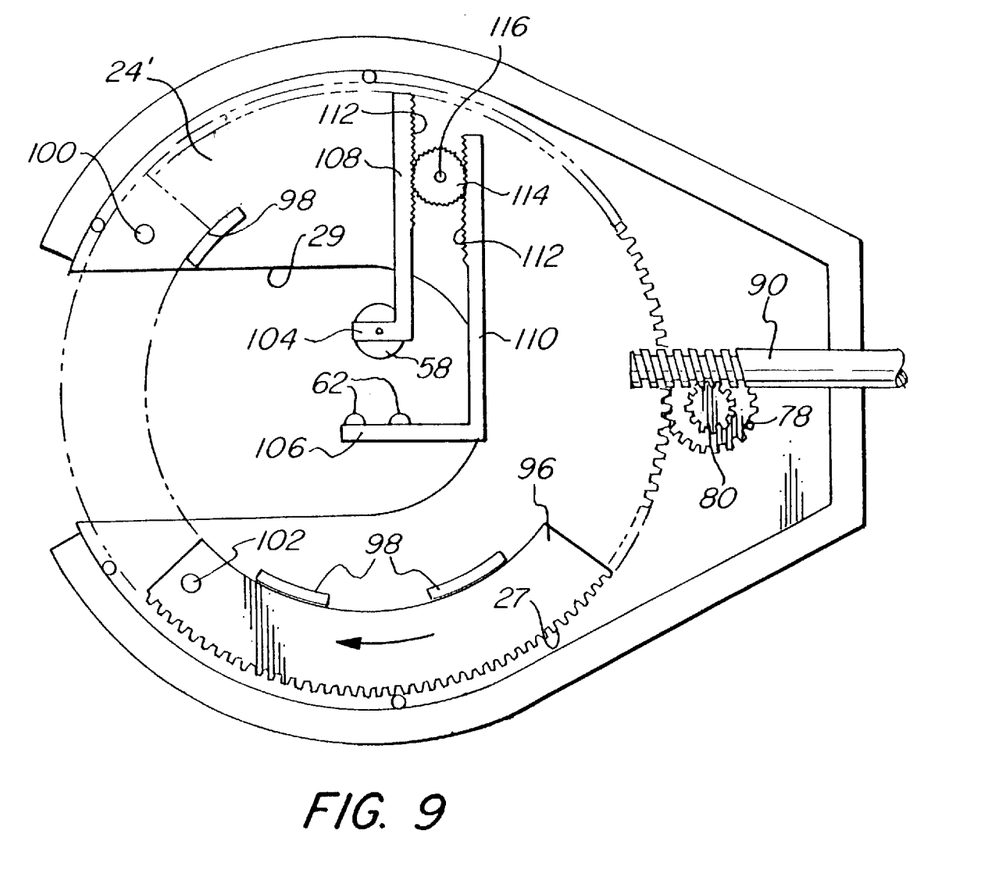
FIG. 9 is a diagrammatic side elevational view of a second form of cutting heads embodying the invention.
Figure 10:
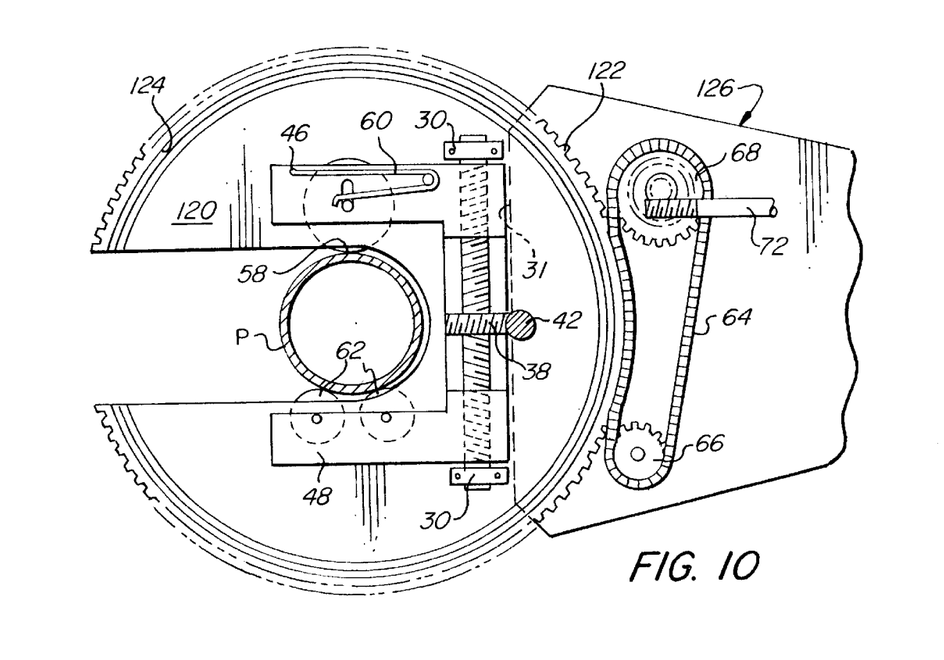
FIGS. 10 and 11 are side elevational views corresponding to FIG. 4, depicting additional cutting heads embodying the invention, in which a preferred form of support members (fragmentarily illustrated) are employed.

FIG. 9 of the drawings illustrates another embodiment of the invention, in which a displaceable segment piece 96 is employed to effectively bridge the mouth of the sprocket channel 29 (it will be appreciated that, here too, a covering panel has been removed). The segment piece 96 is slidably mounted against the rear surface of the mounting plate 24', and is constrained by guide elements 98 for movement between an opened position (depicted in full line in the Figure) and a closed position (depicted in dotted line), securement in closed position being effected by engagement of upstanding boss 100 on the plate 24' in aperture 102 in the piece 96. An array of teeth 27 extend along an outer edge of the segment piece 96, and cooperate with the teeth 25 of the sprocket 26 so as to ensure constant force delivery from a drive chain or gear system (not shown in this Figure).

The power transmission arrangement utilized comprises a compound gear having a smaller element 80 in engagement with a worm shaft 90, and a larger element 78 in engagement with the teeth of the sprocket 24' and segment piece 96. As will be appreciated, because the segment piece 96 bridges the sprocket channel 29 only a single point of power delivery is required.

In further respect of FIG. 9, a second form of self-centering mechanism is illustrated in which relatively short parallel legs 104, 106 of L-shaped components provide confronting jaw portions on which are mounted, respectively, the wheel 58 and the rollers 62. The relatively long parallel legs 108, 110 of the L-shaped components carry, on their inner surfaces, toothed rack portions 112, which mesh with the interposed pinion element 114 of a hand knob, only the shaft 116 of which is seen. As will be evident, rotation of the knob will cause the cutting wheel 58 and the substantially diametrical pair of rollers 62 to move toward or away from one another through equal distances, again to ensure self-centering contact upon a pipe section disposed therebetween; the L-shaped components are biased toward one another, by a high-tension spring or equivalent means (not shown), thereby maintaining a constant, uniform cutting force upon an interposed pipe.

Turning now in detail to FIGS. 10 through 13 of the drawings, therein illustrated are preferred embodiments of the cutter of the invention. As in the preceding figures, elements depicted that are common to the embodiments previously described bear the numbers already assigned, and a cover plate has again been removed from the head depicted in FIG. 10.

The cutter heads of these embodiments utilize a mounting plate, generally designated by the numeral 120, which is formed with a circumferential array of teeth 122 and a marginal circular groove 124 formed into both of the opposite sides of the plate. The support members, generally designated by the numeral 126, comprise front and rear panels 128, 130, which terminate, respectively, at a leading arcuate edge 129 and a leading rectilinear edge 131, and both extend only a short distance beyond the circumferential margin of the mounting plate 120. A channel 134 is defined between the panel 128, 130, and serves to receive the marginal edge portion of the plate 120. Confronting arcuate ribs 132 project inwardly from the panels 128, 130, and are received in the grooves 124 formed in the plate 120, thereby serving to rotatably support the plate on the support member 126; a portion 136 of the lower panel 12 extends beyond the leading edge 129 of the upper panel 128 and thereby provides additional support for the plate 120. It will be appreciated that the marginal edge portion of the plate 120 could alternatively be formed with a circumferential rib (or like structure) seated and engaged within corresponding grooves formed into the surfaces of the panels 128, 130.

Figure 11:
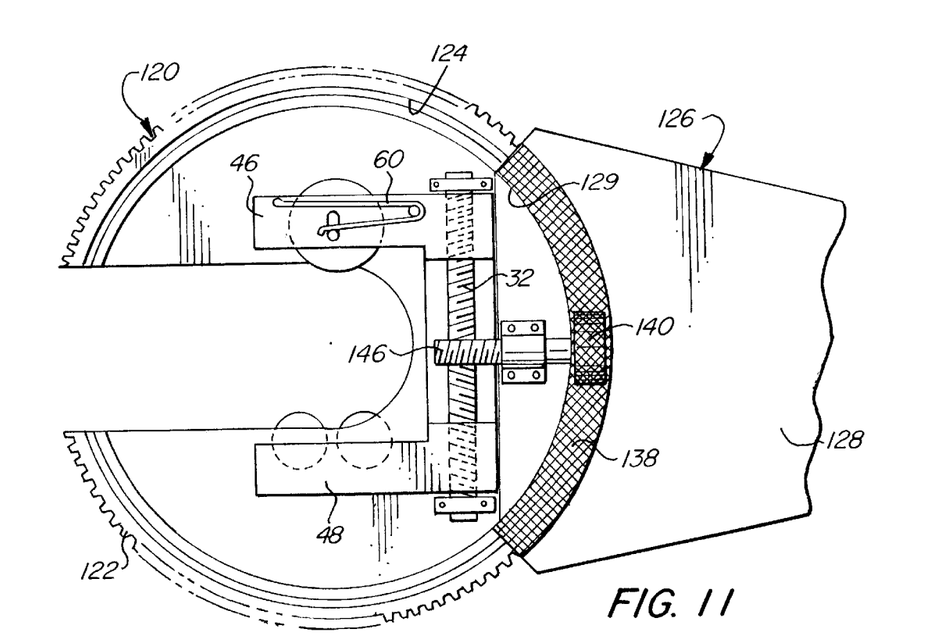
Figure 12:
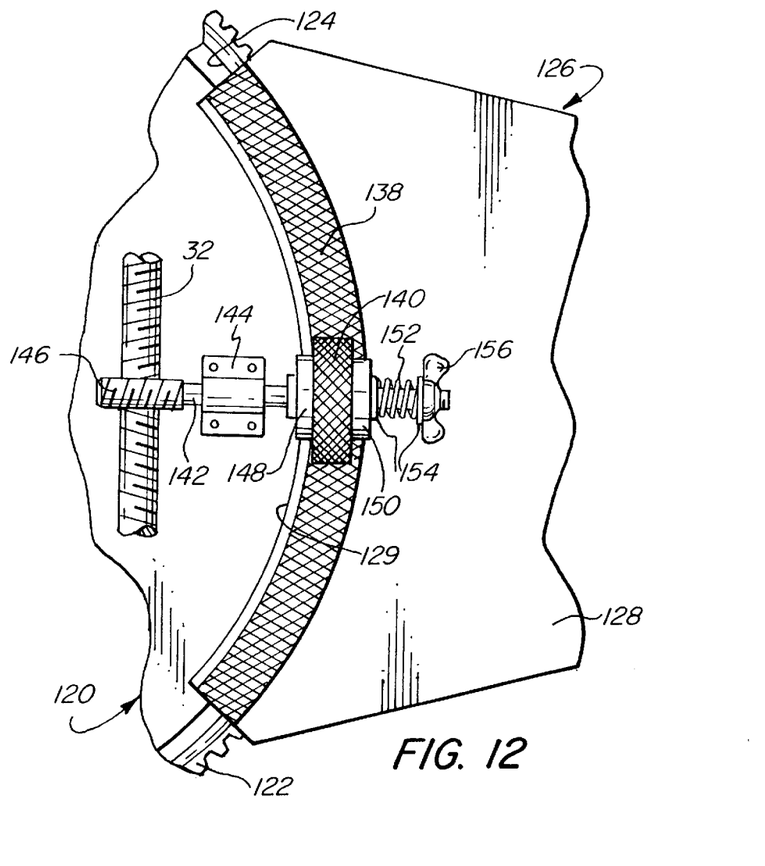
FIG. 12 is a fragmentary view of a cutting head similar to that of FIG. 11, drawn to a further enlarged scale and having a clutch mechanism incorporated into the jaw-adjusting mechanism.
Figure 13:
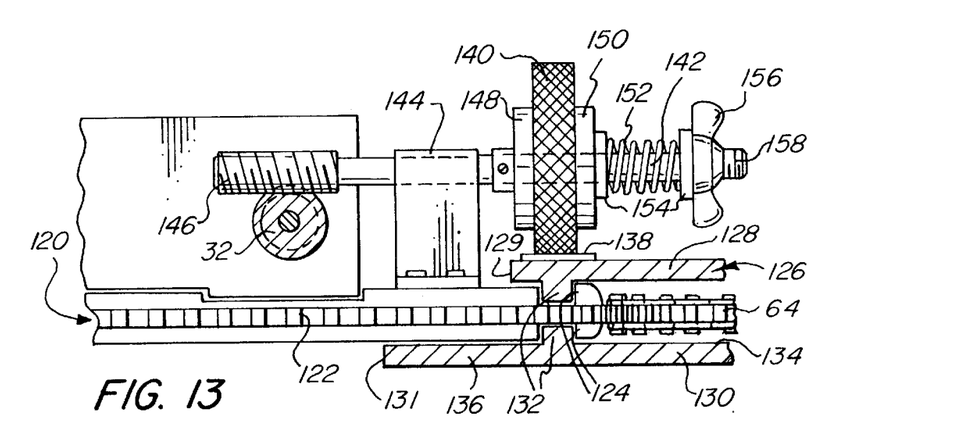
FIG. 13 is a fragmentary elevational view, in partial section, of the portion of the cutting head depicted in FIG. 12.

In the embodiment of FIGS. 11–13, an arcuate friction element 138 is secured to the top surface of the upper plate 128, and is engaged by a friction wheel 140 mounted upon a shaft 142. The shaft 142 is in turn supported by a journal block 144, and carries a worm element 146 on one end, which is in meshing engagement with the adjustment screw 32. A first clutch disk 148 is secured to the shaft 142, and cooperates with a second, movable clutch disk 150 to clamp the friction wheel 140 therebetween. For this purpose a coil spring 152 is disposed about the shaft 142 with its opposite ends bearing upon washers, 154, one of which washers lies against the adjacent clutch disk 150 and the other of which lies against an adjustment wing nut 156; the nut 156 is threadably engaged on the threaded end portion 158 of the shaft 142.

As will be appreciated, the friction wheel 140 is clamped between the clutch disks 148 with sufficient force (the level of which is of course controlled by the position of the wing nut 156) to cause the shaft 142 to rotate, as driven by engagement of the wheel 140 with the friction element 138 as the plate 120 rotates through the support member 126. This will cause the screw 32 to turn in one or the other direction (intermittently, when the wheel 140 is in contact with the element 138), depending upon the direction of rotation of the plate 120, advancing or retracting the jaws 46, 48 so as to effect cutting or withdrawal of the cutting element 58, as appropriate. When the jaws have either advanced or retracted sufficiently to encounter resistance to further movement, the friction wheel 140 will slip on the shaft 142 and thereby provide one form of limit means referred hereinabove.

It will also be appreciated from the foregoing description that, albeit usually beneficial, the cutter need not include a clutch, reliance for the avoidance of damage being dependent instead upon the skill and care of the operation or upon the use of a motor having an incorporated clutch. Also, forms of clutches other than that which is illustrated in FIGS. 12 and 13 can of course be utilized, as will be evident to those skilled in the art. For example, an adjustable clutch having a range of torque settings, of the kind that is in widespread current use on screwdrivers and like electrically powered hand tools, could be incorporated into the instant pipe cutter if so desired.

Thus, it can be seen that the present invention provides a power-operated pipe cutter, especially a hand-held tool, and a cutting head therefor, which can readily be utilized to cut installed pipe and which can reduce significantly the time and effort required to cut both in-place pipe and also separate lengths of material. The pipe cutter and cutting head are of relatively incomplex construction, and can readily be manufactured at relative low cost.

Having thus described the invention what is claimed is:

1. A cutting head for a power-operated pipe cutter, comprising:

a support member having a supporting portion;

a mounting member supported by said supporting portion of said support member for rotation about a central axis of said head, said mounting member having at least a first channel extending inwardly from the periphery thereof for permitting lateral insertion of a pipe thereinto, for disposition on said axis, and said support member being constructed to permit such pipe insertion;

cutting means mounted on said mounting member for rotation therewith and comprising at least two contact elements disposed generally diametrically of said axis and along opposite sides of said first channel, said cutting means being constructed for varying the spacing between said at least two contact elements to permit such lateral insertion of a pipe therebetween and to enable said contact elements to engage opposite sides of a pipe disposed on said axis, at least one of said two contact elements being a cutting element; said cutting means including mounting means comprised of a pair of confronting portions, each said portion supporting at least one of said contact elements thereon, and self-centering adjustment means operatively connected to said confronting portions for varying said spacing between said at least two contact elements, said adjustment means being effective for simultaneously moving said two contact elements toward and away from one another through substantially equal distances; and said head further comprising cooperative means for causing said adjustment means to operatively engage said support member for advancing and retracting said confronting portions of said mounting means upon rotation of said mounting member in one or the other direction; and a power-transmission arrangement comprising driven means, on a peripheral portion of said mounting member, and drive means interengaged with said driven means, said power-transmission arrangement including at least one component that effectively spans the entrance to said first channel at said periphery of said mounting member for enabling the constant delivery of power to said mounting member.

2. The cutting head of claim 1 wherein said drive means is constructed to engage said peripheral portion of said mounting member at at least two locations for effecting rotation thereof, said locations being spaced from one another a distance greater than the width of said entrance to said first channel.

3. The cutting head of claim 2 wherein said mounting member comprises at least one substantially circular plate, and wherein said peripheral portion comprises a circumferential marginal portion of said one plate.

4. The cutting head of claim 3 wherein said driven means comprises an array of teeth extending along said circumferential marginal portion of said one plate.

5. The cutting head of claim 4 wherein said drive means comprises an endless chain disposed to cause a segment thereof, which is longer than said first channel entrance width and which provides said at least one component, to be in constant engagement with said array of teeth, said array of teeth being disposed on the circumferential edge of said one plate.

6. The cutting head of claim 4 wherein said drive means comprises a plurality of gears providing said at least one component, one of said gears being disposed to engage said array of teeth at each of said two spaced locations on said marginal portion of said one plate.

7. The cutting head of claim 3 wherein said one plate is a sprocket.

8. The cutting head of claim 7 wherein said mounting member comprises a first substantially circular plate coaxially affixed to said sprocket and having said cutting means mounted thereon.

9. The cutting head assembly of claim 3 wherein said drive means comprises an endless belt disposed to cause a segment thereof, which is longer than said first channel entrance width and which provides said at least one component, to be in constant driving engagement with said circumferential marginal portion of said one plate, said marginal portion of said one plate being constructed for driven engagement by said endless belt segment.

10. The cutting head of claim 1 wherein said confronting portions comprise separate jaws.

11. The cutting head of claim 10 wherein said jaws have threaded engagement elements thereon, and wherein said adjustment means comprises a threaded member having opposite threaded end portions in operative engagement with said engagement elements.

12. The cutting head of claim 10 wherein said jaws have confronting toothed rack portions thereon, and wherein said adjustment means comprises a pinion rotatably interposed between said jaws and in operative engagement with said rack portions thereof.

13. The cutting head of claim 1 wherein said cutting means includes biasing means operatively connected for urging said at least two contact elements toward one another.

14. The cutting head of claim 1 wherein said supporting portion of said support member is constructed for partially surrounding a pipe and has at least a second channel extending inwardly from the periphery of said support member for permitting lateral insertion of a pipe thereinto for disposition on said central axis of said head.

15. The cutting head of claim 1 wherein said supporting portion comprises a forward marginal portion on said support member.

16. The cutting head of claim 15 wherein said mounting member comprises at least one substantially circular plate, wherein said peripheral portion comprises a circumferential marginal portion of said one plate, and wherein said supporting portion of said support member forms an arcuate channel constructed to receive and engage said circumferential marginal portion of said one plate of said mounting member.

17. The cutting head of claim 16 wherein a circular groove is formed in said circumferential marginal portion on at least one side of said circular plate, extending continuously entirely thereabout, and wherein said supporting portion of said support member has at least one element thereon extending into said arcuate channel and seated in said groove for rotatably engaging said circular plate.

18. A cutting head for a power-operated pipe cutter, comprising:

support member having a supporting portion;
a mounting member supported by said supporting portion of said support member for rotation about a central axis of said head, said mounting member having at least a first channel extending inwardly from the periphery thereof for permitting lateral insertion of a pipe thereinto, for disposition on said axis, and said support member being constructed to permit such pipe insertion;
cutting means mounted on said mounting member for rotation therewith and comprising at least two contact elements disposed generally diametrically of said axis and along opposite sides of said first channel, said cutting means being constructed for varying the spacing between said at least two contact elements to permit such lateral insertion of a pipe therebetween and to enable said contact elements to engage opposite sides of a pipe disposed on said axis, at least one of said two contact elements being a cutting element; and
a power-transmission arrangement comprising driven means, on a peripheral portion of said mounting member, and drive means interengaged with said driven means, said power-transmission arrangement including at least one component that effectively spans the entrance to said first channel at said periphery of said mounting member for enabling the constant delivery of power to said mounting member, said at least one component comprising a peripheral segment piece that is dimensioned and configured to to effectively span said first channel entrance, and said segment piece and said mounting member being cooperatively constructed for displaceably positioning said segment piece in substantial spanning relationship across said first channel entrance, said segment piece being slidably mounted on said mounting member.

19. The cutting head of claim 18, wherein said mounting member is substantially circular, wherein said peripheral portion comprises a circumferential marginal portion of said mounting member, and wherein said segment piece, when so positioned across said first channel entrance, comprises a further marginal portion of said mounting member.

20. A power-operated pipe cutter, comprising in combination:

(a) body;
(b) a motor; and
(c) a cutting head operatively supported on said body and comprising:
a support member having a supporting portion;
a mounting member supported by said supporting portion of said support member for rotation about a central axis of said head, said mounting member having at least a first channel extending inwardly from the periphery thereof for permitting lateral insertion of a pipe thereinto, for disposition on said axis, and said support member being constructed to permit such pipe insertion;
cutting means mounted on said mounting member for rotation therewith and comprising at least two contact elements disposed generally diametrically of said axis and along opposite sides of said first channel, said cutting means being constructed for varying the spacing between said at least two contact elements to permit such lateral insertion of a pipe therebetween and to enable said contact elements to engage opposite sides of a pipe disposed on said axis, at least one of said two contact elements being a cutting element; said cutting means including mounting means comprised of a pair of confronting portions, each said portion supporting at least one of said contact elements thereon, and self-centering adjustment means operatively connected to said confronting portions for varying said spacing between said at least two contact elements, said adjustment means being effective for simultaneously moving said two contact elements toward and away from one another through substantially equal distances; and said head further comprising cooperative means for causing said adjustment means to operatively engage said support member for advancing and retracting said confronting portions of said mounting means upon rotation of said mounting member in one or the other direction; and
a power-transmission arrangement comprising driven means, on a peripheral portion of said mounting member, and drive means operatively connected to said motor and interengaged with said driven means, said power-transmission arrangement including at least one component that effectively spans the entrance to said first channel at said periphery of said mounting member for enabling the constant delivery of power to said mounting member.

21. The pipe cutter of claim 20, wherein said supporting portion of said support member is constructed for partially surrounding a pipe and has at least a second channel extending inwardly from the periphery of said support member for permitting lateral insertion of a pipe thereinto for disposition on said central axis of said head.

22. The pipe cutter of claim 20 wherein said supporting portion comprises a forward marginal portion on said support member.

23. The pipe cutter of claim 22 wherein said mounting member comprises at least one substantially circular plate, wherein said peripheral portion comprises a circumferential marginal portion of said one plate, and wherein said supporting portion of said support member forms an arcuate channel constructed to receive and engage said circumferential marginal portion of said one plate of said mounting member.

24. The pipe cutter of claim 23 wherein a circular groove is formed in said circumferential marginal portion on at least one side of said circular plate, extending continuously entirely thereabout, and wherein said supporting portion of said support member has at least one element thereon extending into said arcuate channel and seated in said groove for rotatably engaging said circular plate.

25. The pipe cutter of claim 20 wherein said motor is supported on said body, said pipe cutter being portable.

* * * * *